United States Patent [19]

Taylor

[11] 3,816,807

[45] June 11, 1974

[54] IMPEDANCE CONTROLLED BATTERY CHARGER AND METHOD OF CHARGING WITH MONITORING OF A.C. ANSWER SIGNAL

[75] Inventor: Dale F. Taylor, Schenectady, N.Y.

[73] Assignee: General Electric Company, Schenectady, N.Y.

[22] Filed: July 18, 1973

[21] Appl. No.: 380,134

[52] U.S. Cl............. 320/20, 320/43, 320/48, 324/29.5
[51] Int. Cl.............. H02j 7/00, G05d 21/02
[58] Field of Search............ 320/20, 22, 30, 39, 40, 320/43, 48; 324/29.5; 340/249

[56] References Cited
UNITED STATES PATENTS

| | | | |
|---|---|---|---|
| 3,683,256 | 8/1972 | Mas | 320/46 X |
| 3,676,770 | 7/1972 | Sharaf et al. | 320/43 X |
| 3,680,072 | 7/1972 | Charbonnier et al. | 320/43 X |

Primary Examiner—J. D. Miller
Assistant Examiner—Robert J. Hickey
Attorney, Agent, or Firm—Paul R. Webb, II; Joseph T. Cohen; Jerome C. Squillaro

[57] ABSTRACT

A battery charger comprises a variable current DC power supply adapted to be connected across a secondary battery, an AC modulator connected to the DC power supply, a phase sensitive detector adapted for connection across the battery, AC voltage reference signal means connected to the phase sensitive detector, and means for monitoring the amplitudes of two different voltage components of the AC voltage appearing across the battery. An impedance controlled battery charger is described in which the monitoring means of the above type of battery charger are provided in the form of a feedback control connected from the output of the phase sensitive detector to the DC power supply automatically adjusting DC current to match current accepting capabilities of the battery. Methods of battery charging are also described.

10 Claims, 2 Drawing Figures

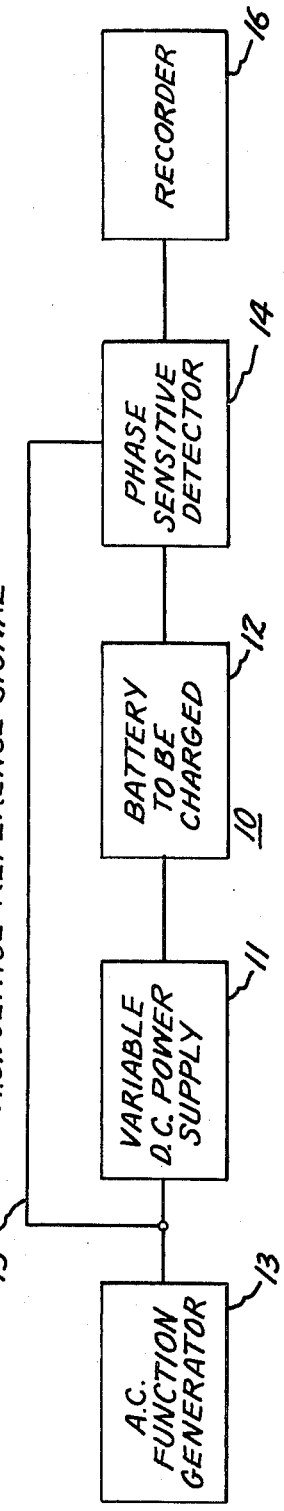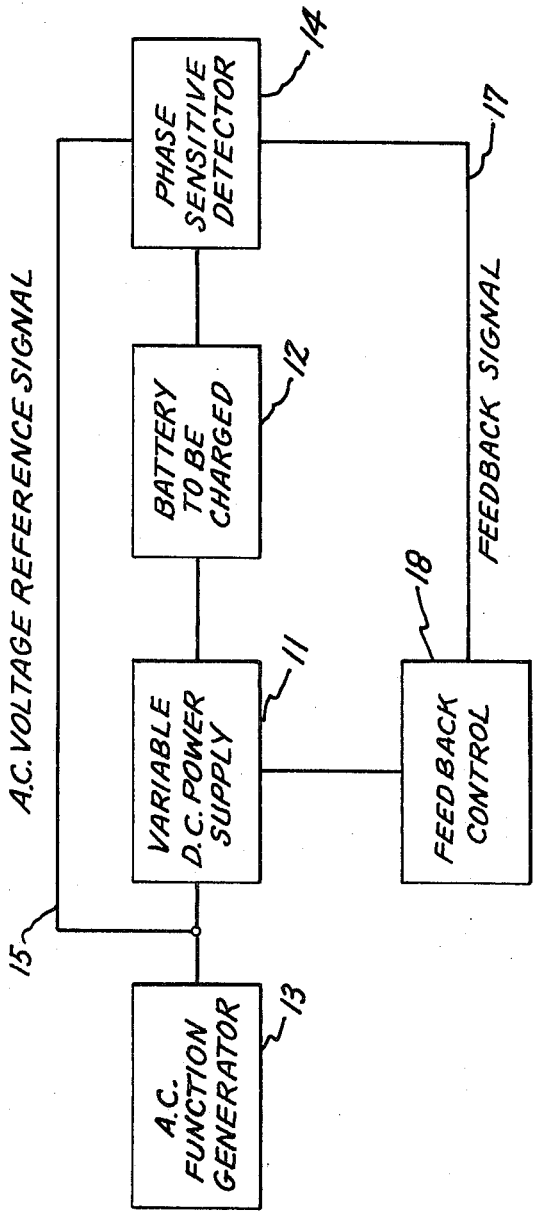

IMPEDANCE CONTROLLED BATTERY CHARGER AND METHOD OF CHARGING WITH MONITORING OF A.C. ANSWER SIGNAL

This invention relates to battery chargers and to methods of charging and, more particularly, to such battery chargers for and to methods of charging secondary batteries.

Battery chargers and methods of charging are necessary for secondary batteries such as lead-acid batteries which produce gas on overcharge. Ideally, such battery chargers and methods of charging should have the ability to sense the charge accepting capabilities of the battery during charge, and provide the maximum current that can be electrochemically converted to stored energy at close to 100 percent current efficiency. Under these conditions, gassing or other secondary reactions and the associated temperature increase and degradation of both positive and negative plates would be significantly reduced.

The two most common methods of charging are by constant current or constant voltage techniques. With lead-acid batteries, the former is usually accomplished with the 8-hour rate to free gassing followed by a finishing rate equal to approximately 40 percent of the initial rate, again to free gassing. A completed charge is indicated by uniform gassing, constant electrolyte specific gravity, constant on-charge battery voltage, measured ampere-hour input, or a combination of these.

The constant voltage method is usually modified so that the initial current is limited to convenient values. For lead acid batteries, the applied voltage depends on temperature, internal resistance, grid composition, and on the organic expanders present in the negative plates. Under ideal circumstances, constant voltage methods are more efficient than constant current methods, providing approximately the maximum input current that the battery can absorb without wasting energy in gas formation.

Present-day lead-acid traction batteries which are designed for relatively high-rate, deep-discharge duty are normally constructed with cast lead-antimony alloy grids. This alloy appears to offer the best deep cycling characteristics providing for the longest life and best active material adhesion of the various lead alloys which have been tested over the years. The major disadvantages associated with antimonial lead positive grids is a gradual reduction in the on-charge gassing voltage as the battery ages, the result of antimony migration from corroding positive grids to the spongy lead negative active material, and subsequent lowering of the hydrogen overvoltage.

Thus constant-current charging is effective, but very inefficient and detrimental to long battery life, and voltage-controlled methods can lead to overcharge with aging or excessively high battery temperatures, and undercharging at low temperatures, unless the system is carefully adjusted to compensate for changes as they occur. Furthermore, if the applied voltage is adjusted so as to allow for moderate gassing during the final stages of charging, a necessity if consistent undercharging is to be avoided, positive grid corrosion will be aggravated throughout the charging period.

In an attempt to overcome the effects of temperature and age, innovators in the field have turned to a more direct indicator of battery acceptance, the gas evolution rate. However, such systems appear to be unstable and have the battery aging problem associated therewith.

My present invention is directed to an impedance controlled battery charger and method of charging which overcomes the problems associated with the above-discussed charging methods.

The primary object of my invention is to provide a battery charger and method of charging wherein battery impedance is a charge control parameter.

In accordance with one aspect of my invention, an impedance controlled battery charger comprises a variable current DC power supply adapted to be connected across a secondary battery, an AC modulator connected to the DC power supply, a phase sensitive detector adapted for connection across the battery, AC voltage reference signal means connected to the phase sensitive detector, and means for monitoring the amplitudes of two different voltage components of the AC voltage appearing across the battery.

These and various other objects, features and advantages of the invention will be better understood from the following description taken in connection with the accompanying drawing in which:

FIG. 1 is a block diagram of a battery charger made in accordance with the present invention; and FIG. 2 is a block diagram of a modified automated impedance controlled battery charger made in accordance with my invention.

In FIG. 1 of the drawing, there is shown a block diagram of an impedance controlled battery charger 10 which has a variable current DC power supply 11 shown connected across a secondary battery 12, such as a lead-acid battery, which produces gas on overcharge. An AC modulator 13, in the form of an AC function generator, which can provide a sinusoidal AC signal of any desired frequency and amplitude is connected to control variable current DC power supply 11. A phase sensitive detector 14 is connected across battery 12. An AC voltage reference signal shown by line 15 is connected from AC function generator 13 to phase sensitive detector 14. A display device, such as, recorder 16 is connected to the phase sensitive detector 14 to monitor its output.

In the operation of the battery charger 10 shown in FIG. 1, variable current DC power supply 11 is adjusted to provide a particular convenient maximum DC current to battery 12 to produce charging of battery 12. The current should be less than the initial acceptance current. AC function generator 13 is connected to the DC power supply 11 whereby an AC current of known phase and amplitude is superimposed upon the DC current from the power supply 11. An AC voltage reference signal of known phase with respect to the AC current required for phase sensitive detector 14 can be provided by AC function generator 13 allowing for phase shift introduced by the power supply, or provided from a resistive element in series with battery 12 and power supply 11.

The AC voltage appearing across the terminals of battery 12 being charged by the DC power supply 11 is provided to the input of phase sensitive detector 14 which measures the amplitudes of two AC voltage components of the AC voltage appearing across the terminals of battery 12, which voltage component phases differ by a known phase angle, preferably 90° and bear a known relationship to the phase of the AC current, preferably being in and out-of-phase with the AC current. Two DC voltage signals can be provided from the output of the phase sensitive detector 14. These DC voltage signals would be proportional to the amplitudes of the AC voltage components. The AC voltage component amplitudes are monitored on a display device 16 until marked changes occur.

During current acceptance by the battery, the AC voltage component amplitudes change at a relatively slow rate. As the current acceptance is exceeded using the preferred phase relationships, the monitored and displayed signals show a marked increase in the amplitude of the out-of-phase signal and a marked decrease in the amplitude of the in-phase signal. This marked change in the amplitudes of signals is employed to terminate the charge or to adjust the current to reverse these changes in amplitude. Such termination or adjustment of current is shown as a manual operation in the device of FIG. 1. The marked changes in amplitude will provide a displayed cross-over of the amplitudes of the two signals if the amplitudes are similar. The magnitude of either signal can be amplified also to provide similar amplitudes.

In FIG. 2 of the drawing, there is shown a block diagram of a modified automated impedance controlled battery charger which has a variable current DC power supply 11 which is adjusted to provide a particular convenient maximum DC current to battery 12 to produce charging of battery 12. As in FIG. 1, the battery charger of FIG. 2 includes also an AC modulator 13, a phase sensitive detector 14, and an AC voltage reference signal 15 which functions in the same manner as described above with reference to battery 12 to be charged.

While in the above battery charger of FIG. 1 wherein battery impedance is a charge control parameter, the battery charger of FIG. 2 is an impedance controlled battery charger. The two DC voltage signals which are provided from the output of phase sensitive detector 14 are fed by feedback signal 17 to a feedback control 18 which adjusts automatically the DC current input to battery 12 to maintain the difference in the AC voltage component amplitudes at that value corresponding to the limit of the battery's current accepting capability.

Since ideally the battery charger and method of charging should have the ability to sense the charge accepting capabilities of the particular battery during charge and provide the maximum current that can be electrochemically converted to stored energy at close to 100 percent current efficiency, my battery charger, impedance controlled battery charger and method of charging can employ a maximum DC current for the charge accepting capabilities of the particular battery.

I found that when the difference in the AC voltage component amplitudes is at that value corresponding to the limit of the battery's current accepting capability as displayed, for example, as a cross-over of the signals, I can manually or automatically terminate the charging. Further, I can manually or automatically adjust the DC current input to the battery thereby maintaining the AC voltage component amplitudes at that value corresponding to the limit of the battery's current accepting capability.

I have found that when I employ an AC reference signal from the AC modulator, adjustment of the signal must be made initially in the phase sensitive detector in preferred mode of operation so that the reference signal is in phase with the AC current. However, if I employ a resistance at the output of the DC power supply and connect the AC voltage reference signal means across this resistance and to the phase sensitive detector, no adjustment is necessary.

Additionally, I found that a wide variety of frequencies from the AC modulator are suitable, for example, from about 0.1 Hz and higher with the optimum value being dependent on the physical characteristics of the battery. The amplitude of the AC current should be less than the magnitude of the minimum DC current. Thus, one or several sequential adjustments of the DC current are possible subject to the above limitation.

Examples of batteries which have been charged by my impedance control charger and method of charging are set forth below in the following Examples.

Examples 1–10 were performed on various batteries which are identified further below but each of these Examples employed a battery charger and method of charging as shown generally in FIG. 1 of the drawing and as described above in connection with the FIGURE. These Examples illustrate that marked and useful changes occur in the AC voltage component amplitudes as charge acceptance is exceeded. Charging at constant current to free gassing produces changes in impedance which show excellent correlation with initiation of gassing as indicated by charging DC battery voltage. Example 11 employed an automated impedance control charger and method of charging as shown generally in FIG. 2 and as described above in connection with that FIGURE. Uniform gassing was deliberately allowed prior to termination. Examples 1–7 employed a motorcycle 6 volt, 12 AH lead acid battery. Examples 8–9 employed a 6 volt, 220 AH lead acid golf-car battery. Example 10 employed a 1 AH nickel cadmium sealed cell. Example 11 employed a 6 volt, 12 AH lead acid battery.

In each of the Examples 1–11 a commercial variable DC power supply of 50 amps, 10 volts maximum-output was used to provide variable DC current to the respective battery to be charged. The DC voltage varied as required by the battery characteristics and state of charge.

A commercial AC signal function generator as the AC modulator was connected to a variable current DC power supply and further provided an AC voltage reference signal to a phase sensitive detector. The phase angle of the AC current superimposed on the DC charging current was defined at 0°. A commercial phase sensitive detector was employed to measure the amplitudes of the AC voltage components in and out of phase with the AC current flowing through the battery, using the aforementioned AC voltage reference signal as a phase reference. A conventional recorder was connected to the output of the phase sensitive detector.

Each battery was discharged before charging. Table I is set forth below to show for Examples 1–10 the magnitudes of the DC and the superimposed AC currents during initial charge; the duration of charging until crossover of the phase sensitive detector output voltage signals; and the duration of the continued charge after initiation of gassing to manual termination. In Examples 1–6 and 8–10, the charging was continued after initiation of gassing for an arbitrary time until manual termination.

TABLE I

| Example number | Charging current, amps DC | Initial charge Superimposed AC, current-amps (RMS) and frequency (Hz.) | Duration, minutes | Continued charge duration, minutes |
|---|---|---|---|---|
| 1 | 1.0 | 0.06 | 16 | 27.0 | 16.0 |
| 2 | 1.0 | 0.06 | 8 | 27.0 | 16.0 |
| 3 | 1.0 | 0.06 | 4 | 28.0 | 20.0 |
| 4 | 1.0 | 0.06 | 10 | 26.0 | 11.0 |
| 5 | 1.0 | 0.125 | 10 | 26.0 | 13.0 |
| 6 | 1.0 | 0.250 | 10 | 26.0 | 15.0 |
| 7 | 3.0 | 0.125 | 10 | 14.0 | 8.0 |
| 8 | 20.0 | 0.5 | 1.5 | 27.0 | 16.0 |
| 9 | 20.0 | 0.5 | 4 | 30.0 | 25.0 |
| 10 | 0.5 | 0.06 | 1.5 | 34.0 | 9.0 |

In Example 7, after the initial charge of 14 minutes at which point the signals crossed over the charging was continued at a reduced DC current of 1.0 amp for 8 minutes until a second cross-over occurred. Charging of the battery was then continued with gassing for 8.0 minutes before manual termination.

EXAMPLE 11

After the battery had been discharged for 30 minutes through a 0.5 ohm resistor, a charging current of 15 amps DC was applied. The AC current signal applied was 0.25 amp (RMS), 10 Hz. The initial charging continued for 17 minutes before the difference in AC voltage component amplitudes approached zero. The DC current was then continuously reduced automatically over a period of 32 minutes by the feedback control to a final value of 1 amp at which time gassing became evident. Manual termination took place 55 minutes later.

While other modifications of the invention and variations thereof which may be employed within the scope of the invention have not been described, the invention is intended to include such as may be embraced within the following claims:

What I claim as new and desire to secure by letters Patent of the United States is:

1. A battery charger which comprises a variable current DC power supply adapted to be connected across a secondary battery, an AC modulator connected to the DC power supply, a phase sensitive detector adapted to be connected across the battery, AC voltage reference signal means connected to the phase sensitive detector, and means for monitoring the amplitudes of two different voltage components of the AC voltage appearing across the battery.

2. A battery charger as in claim 1, in which the monitoring means monitor two DC voltage signals from the phase detector which signals are proportional to the amplitudes of the in-phase and out-of-phase voltage components of the AC voltage appearing across the battery.

3. A battery charger as in claim 1, in which the AC voltage reference signal means is connected from the output of the AC modulator to the phase sensitive detector.

4. A battery charger as in claim 1, in which the AC voltage reference signal means is connected across a resistance in series with the battery at the output of the DC power supply and to the phase sensitive detector.

5. A battery charger as in claim 1, in which the monitoring means is a display device.

6. An impedance controlled battery charger as in claim 1, in which the monitoring means is a feedback control connected from the output of the phase sensitive detector to the DC power supply automatically adjusting DC current to match current accepting capabilities of the battery.

7. A method of charging a secondary battery which comprises applying a DC current across a battery to be charged, superimposing an AC current on the DC current, providing a voltage reference signal of known phase with respect to the AC current, measuring the amplitudes of two different AC voltage components from the battery output which voltage components differ by a constant and known phase angle, monitoring the AC voltage component amplitudes until changes occur indicating that current accepting capability of the battery has been exceeded, and adjusting the DC current input to the battery to maintain the difference in the AC voltage component amplitudes at that value corresponding to the limit of the battery's current accepting capability.

8. A method of charging a secondary battery as in claim 7, in which the amplitudes are measured of two AC voltage components from the battery output which voltage components are 90° out-of-phase with each other, providing two DC voltage signals which are proportional to the amplitudes of the in-phase and out-of-phase voltage components measured across the terminals of the battery, and monitoring the two DC voltage signals until changes occur indicating that current accepting capability of the battery has been exceeded prior to adjusting the DC current input to the battery.

9. A method of charging as in claim 7, wherein the two AC voltage component amplitudes are monitored on a display device.

10. An impedance controlled method of charging as in claim 7, wherein the two AC voltage component amplitudes are monitored by a feedback control which adjusts automatically the DC current input to the battery to maintain the difference in the AC voltage component amplitudes at that value corresponding to the limit of the battery's current accepting capability.

* * * * *